Nov. 10, 1942.  A. BOYNTON  2,301,191
WELL TESTING DEVICE, RAT HOLE TYPE
Filed Oct. 28, 1938  4 Sheets-Sheet 1

ALEXANDER BOYNTON, INVENTOR,
BY Jesse R. Stone
Lester B. Clark
ATTORNEYS.

Nov. 10, 1942.   A. BOYNTON   2,301,191
WELL TESTING DEVICE, RAT HOLE TYPE
Filed Oct. 28, 1938   4 Sheets-Sheet 2
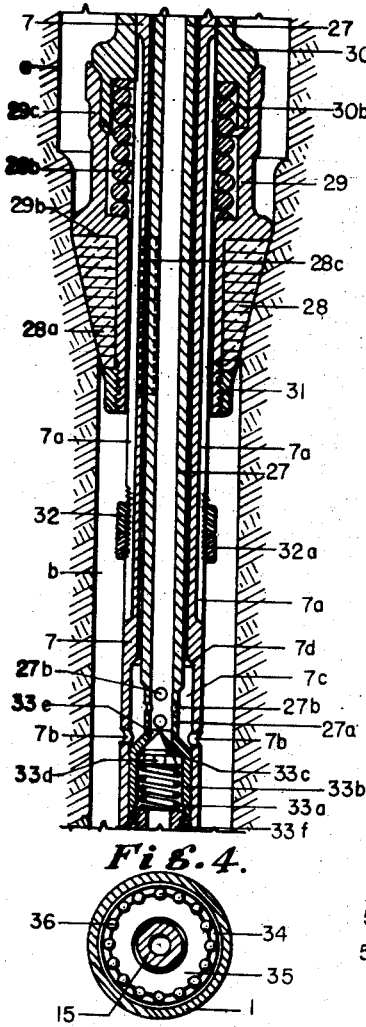
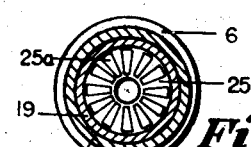
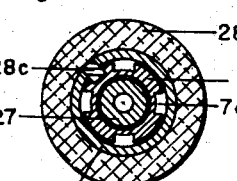
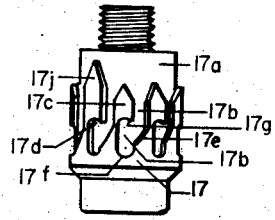
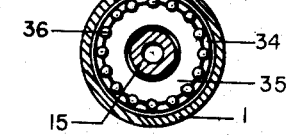
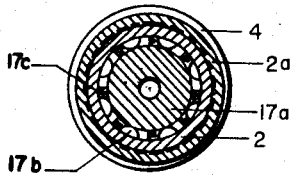
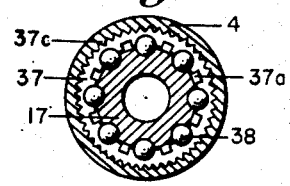
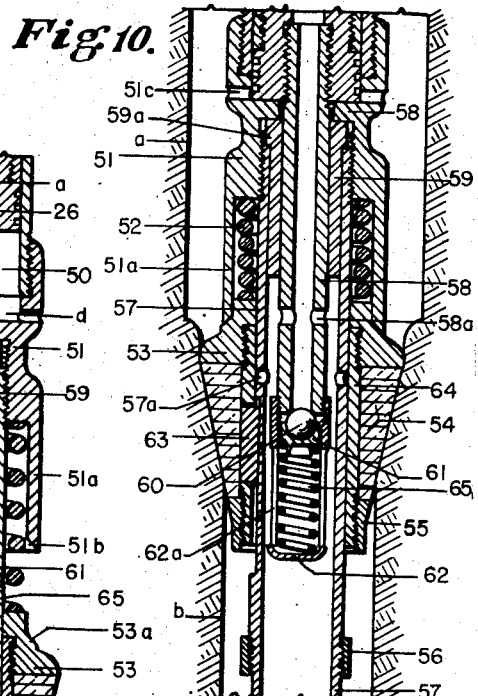
ALEXANDER BOYNTON,
INVENTOR,
BY Jesse R. Stone
Lester B. Clark
ATTORNEYS.

Nov. 10, 1942.  A. BOYNTON  2,301,191
WELL TESTING DEVICE, RAT HOLE TYPE
Filed Oct. 28, 1938  4 Sheets-Sheet 3
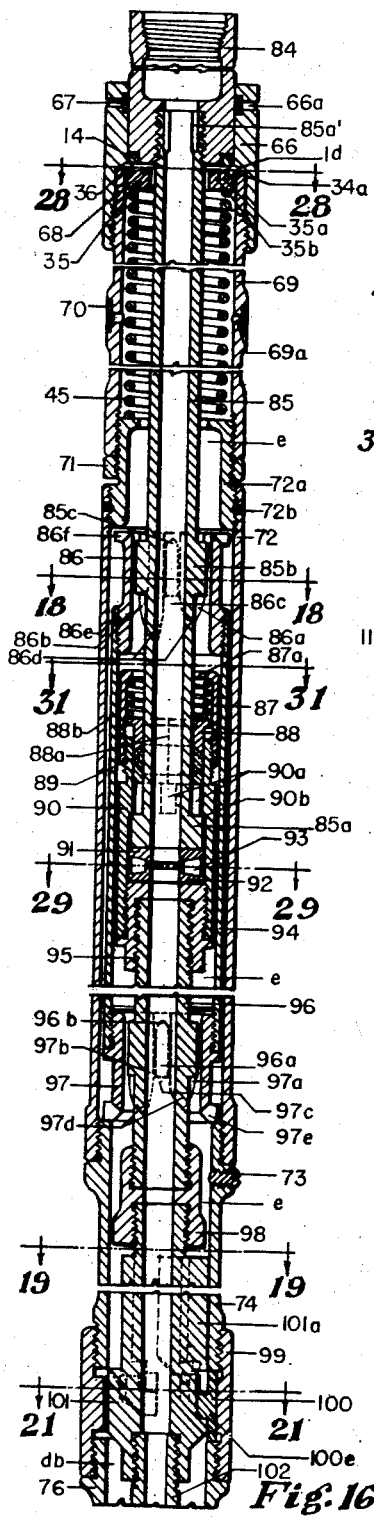
Fig. 16.
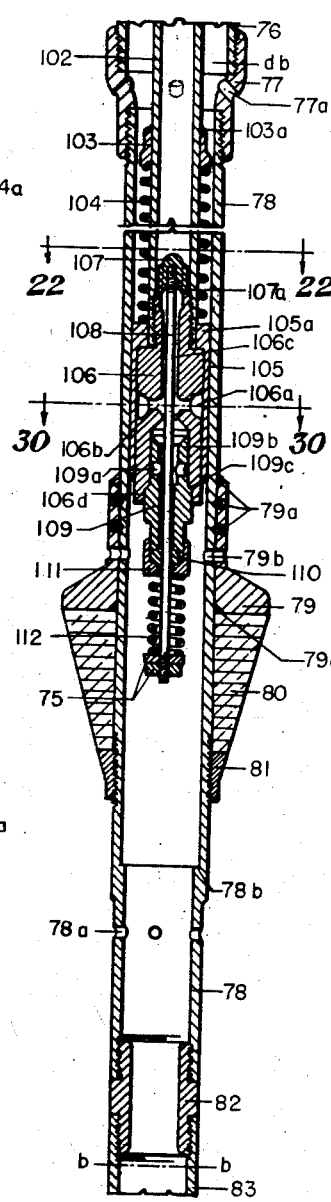
Fig. 17.
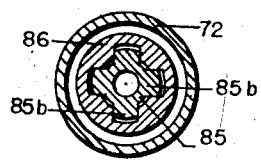
Fig. 18.
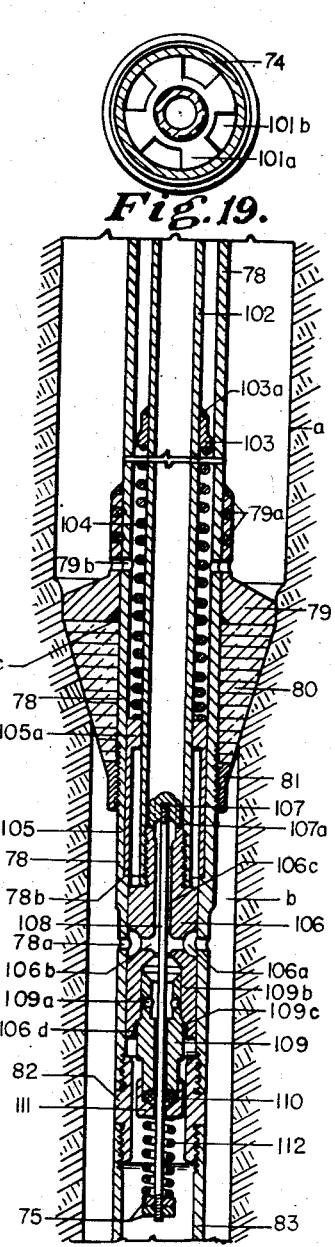
Fig. 19.
Fig. 20.
ALEXANDER BOYNTON,
INVENTOR,
BY Jesse C. Stone
Lester B. Clark
ATTORNEYS.

Nov. 10, 1942. A. BOYNTON 2,301,191
WELL TESTING DEVICE, RAT HOLE TYPE
Filed Oct. 28, 1938 4 Sheets-Sheet 4
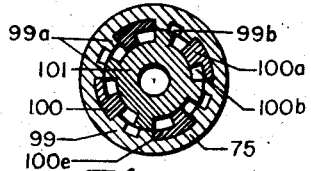
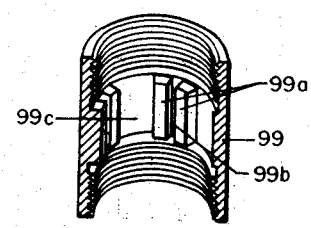
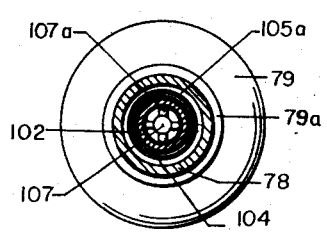
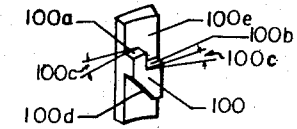
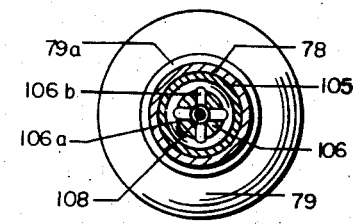
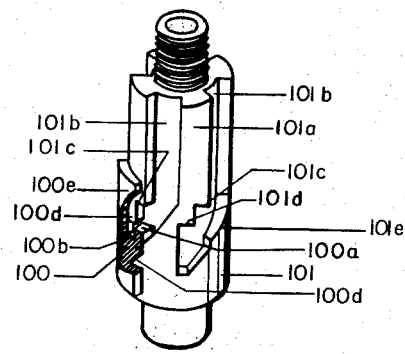
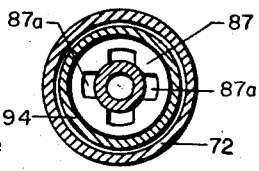
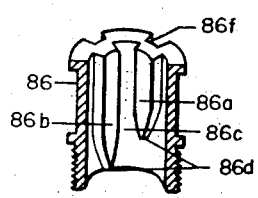
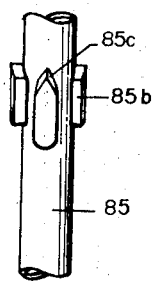
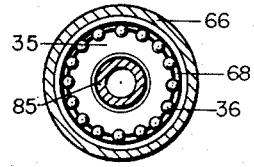
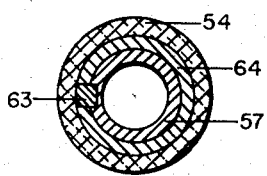
ALEXANDER BOYNTON,
INVENTOR,
BY Jesse R. Stone
Lester B. Clark
ATTORNEYS.

Patented Nov. 10, 1942

2,301,191

UNITED STATES PATENT OFFICE 2,301,191

WELL TESTING DEVICE, RAT HOLE TYPE

Alexander Boynton, San Antonio, Tex.

Application October 28, 1938, Serial No. 237,523

14 Claims. (Cl. 166—1)

The invention relates to improvements in well testing devices in which a packer, clutch, latch, flare chamber, valves, and instrument case are formed into an assembly to run into an uncased well for the purpose of ascertaining the nature and quantity of fluid which the well would produce if casing be set and the well completed.

In testing uncased formations of drilling wells, particularly oil wells, with this device, it is contemplated that the well bore will be provided with a concentric shoulder or rat hole upon which a packer is set, so as to exclude mud fluid above the packer from entering the drill stem, and to allow formation fluid to enter the drill stem below the packer, which thus forms a barrier between the formations above and below it. In this manner all formations of the rat hole are caused to discharge their production into the drill stem where such production is trapped for withdrawal and examination.

Any tubular string of proper size and strength may be employed to lower the device into the well, the drill stem being hereinafter referred to as this means. The drill stem is empty when lowered into the well, and the formation test fluid is trapped therein by means of a valve which prevents well fluid from entering into the drill stem until after the packer is set, at which time the intake valve opens below the packer, and remains open until the weight of the drill stem is lifted off the packer, when the intake valve again closes, and remains closed until the device is withdrawn from the well or until the packer is reset.

In lowering and withdrawing testing tools, the packers often meet great resistance from the drilling mud in the well bore, so I have provided that some of this mud fluid is allowed to bypass through the packer.

When the packer is set down upon the rat hole the fluid under the packer may be forced out of the rat hole and past the packer and it may cut the seat. In order to avoid this cutting I have provided means whereby this fluid is by-passed through the packer while the packer is seating.

Great difficulty will often be experienced in removing a packer from a rat hole, unless the pressures above and below the packer are equalized when the packer is being pulled out of the rat hole. Such equalization of pressure is provided.

If a well be allowed to stand without maintaining circulation the mud fluid sometimes precipitates its heavy content or the wall caves, making it necessary to pump through the drill stem in order to reach bottom, or to get back out of the well. The present device may be pumped through at any time.

Drill stems often stick or "freeze" in a well if allowed to stand without being rotated, but to prevent this a clutch is provided to rotate the drill stem and packer as a unit before the packer is set, and to rotate the drill stem independently of the packer during the test.

In lowering a packer into a deep well the packer may be forced into mud by great weight of the drill stem and may become so embedded that it cannot be withdrawn. This device employs a latch which transmits an audible and noticeable vibration to the top of the well as a means for signalling the operator when dangerous mud or cavings are encountered.

This device may have the full weight of the drill stem set down upon it as often as is necessary to secure proper seating of the packer, but can be opened only when a partial clockwise rotation of the drill stem causes the intake ports to open.

The character of seal-off that any packer will make is never positively known, and consequently, whether all the fluid found in the drill stem after the test, came from formations of the rat hole is a matter of surmise and speculation, unless the fluid from above the packer be colored or marked to identify it. This fluid is so identified by having a liquid of distinguishing color discharged into it as the packer is seated.

It is important that the temperatures and pressures of producing formations be ascertained. The device is equipped with an instrument case for containing recording instruments which will give this information.

Some testing tools, such as those which employ shear pins, fracture plates, or left hand threads, have to be manually conditioned and readjusted for each test, which entails trouble, expense, and loss of time, whereas the present device employs no left hand threads, requires no left hand rotation, has no gears, shear pins, or fracture plate, and makes no use of falling weights, go-devils, or other uncertain means to operate it. All parts of this device automatically resume their normal positions in readiness for another test as soon as the packer is lifted from its seat at conclusion of the preceding test.

The main objects of this invention are to provide a formation testing device for drilled or drilling wells, which device has the following advantages:

First: That it may be safely run into, and readily withdrawn from a well for the purpose of recovering a measured sample of the well's production from the horizon below where the packer is set.

Second: That the pipe upon which the device is run may be rotated from top to bottom, including the device itself, while it is being lowered into or being withdrawn from the well.

Third: That the drill stem may be rotated above the packer during a production test while the packer remains stationary.

Fourth: That it may be pumped through at any time.

Fifth: That it affords means for advising the operator when mud or cavings that should be rotated through or pumped out have been encountered as the device is being lowered into operating position.

Sixth: That it enables the packer to be let down upon its seat repeatedly until the best possible seal-off has been obtained before the test is begun by opening the intake ports.

Seventh: That the device minimizes resistance of mud fluid in the well while it is being lowered and while the packer is being lifted from its seat, and while the device is being withdrawn from the well.

Eighth: That it automatically returns all of its parts to their normal positions as soon as the drill stem is raised at conclusion of each test, thus enabling that the test may be repeated as often as may be desired by raising the drill stem slightly and swabbing or bailing out the test fluid at conclusion of each test.

Ninth: That it will show whether any of the test fluid came from formations other than the one being tested.

Tenth: That pressure and temperature recording instruments, and other instruments, if desired, may be placed in the device for the purpose of ascertaining the pressure and temperature and variations thereof which obtained in the well during the test.

Eleventh: That the great expense of coring formations in order to estimate the production thereof may be now largely dispensed with by employing this device to accurately determine the future production which cores frequently indicate inaccurately.

Twelfth: That, in effect, by temporarily producing from the well before casing is set, the great financial risk of completing unproductive wells may be definitely avoided.

With the foregoing, and other related objects in view, reference is now made to the drawings, in which Fig. 1 is an outside view of the device suspended in a well bore.

Fig. 4 is a longitudinal section of a portion of the device shown in Fig. 3, showing the packer seated in the rat hole of a well bore and the intake ports open.

Fig. 5 is a transverse section on the line 5—5, Fig. 2.

Fig. 6 is a transverse section on the line 6—6, Fig. 2.

Fig. 7 is a transverse section on the line 7—7, Fig. 2.

Fig. 8 is a transverse section on the line 8—8, Fig. 2.

Fig. 9 is a transverse section on the line 9—9, Fig. 3.

Fig. 10 is a transverse section on the line 10—10, Fig. 3.

Fig. 11 is a longitudinal section of a portion of the first modified form of the invention, the remaining portion thereof being like the device shown in Figs. 2 and 3.

Fig. 12 is a perspective view in vertical section of the upper base of Fig. 2.

Fig. 13 is a perspective view in vertical section of the lower base of Fig. 2.

Fig. 14 is an outside view of the clutch shell member of Fig. 2.

Fig. 15 is a longitudinal section of the portion of the device shown in Fig. 11, showing the packer seated in the rat hole of a well bore and the intake ports open.

Fig. 16 is a longitudinal section of the upper portion of the second modified form of the invention.

Fig. 17 is a longitudinal section of the remaining portion not shown in Fig. 16, except that the lower end is missing, the missing portion being like the corresponding portion below the line b—b, Fig. 3.

Fig. 18 is a transverse section on the line 18—18, Fig. 16.

Fig. 19 is a transverse section on the line 19—19, Fig. 16.

Fig. 20 is a longitudinal section of a portion of the device as shown in Fig. 17, with the packer seated upon the rat hole of a well bore and the intake valve open.

Fig. 21 is a transverse section on the line 21—21, Fig. 16.

Fig. 22 is a transverse section on the line 22—22, Fig. 17.

Fig. 23 is a longitudinal section in perspective of the upper member of Fig. 16.

Fig. 24 is an outside view in perspective of the clutch key nipple, Fig. 16.

Fig. 25 is a longitudinal section in perspective of the coupling member of Fig. 16.

Fig. 26 is a perspective view of the part 100, Fig. 16.

Fig. 27 is a perspective view of the lugs and shell of Fig. 16, a portion of the lugs being broken away.

Fig. 28 is a transverse section on the line 28—28, Fig. 16.

Fig. 29 is a transverse section on the line 29—29, Fig. 16.

Fig. 30 is a transverse section on the line 30—30, Fig. 17.

Fig. 31 is a transverse section on the line 31—31, Fig. 16.

Fig. 32 is a transverse section on the line 32—32, Fig. 11.

The same reference characters are employed to refer to the same parts throughout the several views.

Figure 1:
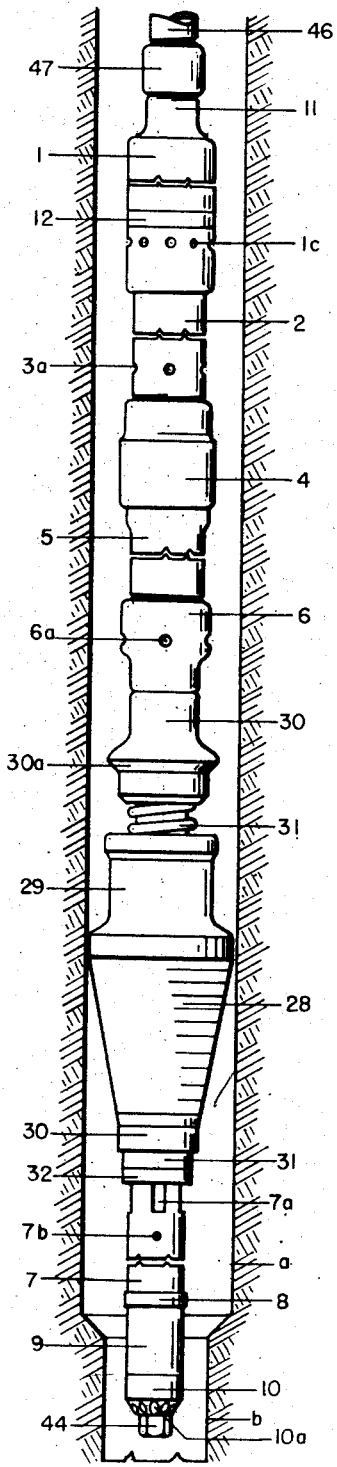

In Fig. 1, the preferred form of the invention is shown suspended in a well bore $a$, approaching the rat hole $b$, the drill stem 46 being connected to member 11 by coupling 47.

The outer shell consists of the latch clamp member 1, nipple 2, coupling member 4, nipple 5, reducing coupling 6, nipple 7, connection member 8, nipple 9, and bottom end member 10.

The inner string consists of a drill stem connection member 11, nipple 15, having wrench slots 15a, connection member 16, clutch shell 17, nipple 18, clutch shell member 19, connection member 26, and valve actuating nipple 27.

Figure 2:
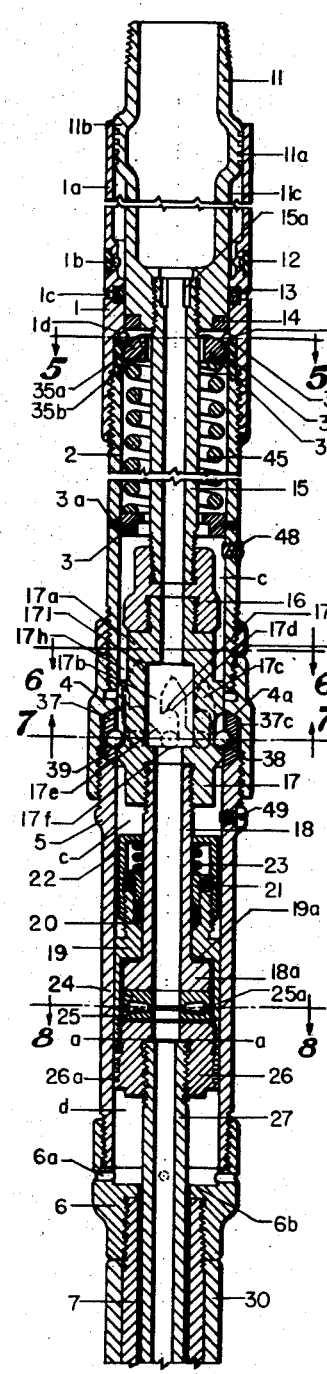
Fig. 2 is a longitudinal section of the upper portion of the preferred form of the invention.
Figure 3:
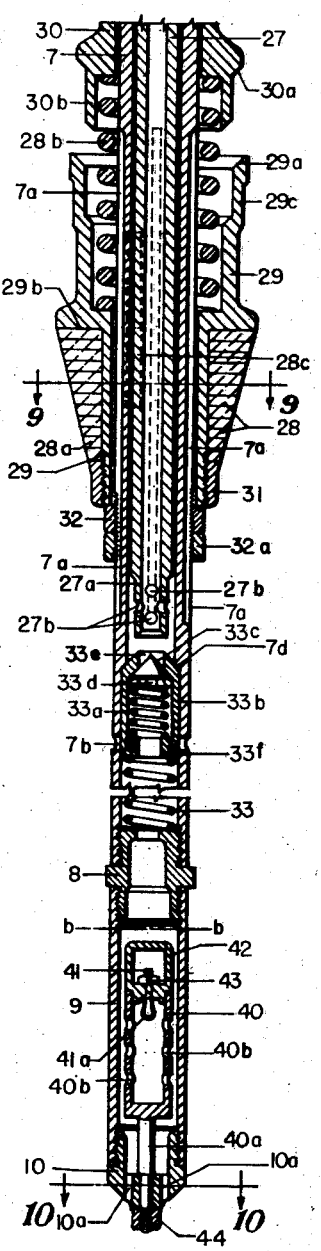
Fig. 3 is a longitudinal section of the lower portion of the preferred form of the invention, completing the part shown in Fig. 2.

The packer 28, Fig. 3, which may be of rubber, leather, belting washers, or other tough, durable substance, is illustrated as consisting of a plurality of belting washers 28a fitted over the lower portion of packer sleeve 29 and locked against the circular shoulder 29b by a retaining ring 31. In the lowermost position of the packer its sleeve 29, which has a sliding fit over the nipple 7, lands upon the stop ring 32, secured by locking ring 32a. The spring 28b urges the packer downward and holds the upper end of external valve member 30 to engage reducing coupling 6, Fig. 2, so as to cause the members 29 and 30 to stand apart as appears in Fig. 3. The valve 30a is adapted to engage its seat 29a when the packer lands upon the rat hole with some of the weight of the drill stem upon it, as appears in Fig. 4, slight clearance being provided between the tubular extension 30b and the upper end of enlarged internal diameter 29c of the packer sleeve 29, as shown in Fig. 4.

Equalization by fluid communication between the rat hole below the packer and the bore above the packer while the packer is being seated, is very important in order to prevent the packer seat from being cut by the fluid which otherwise would otherwise be forced out between the packer and the seat as the packer moves into the rat hole, but such equalization is still more important while the packer is being raised from its seat. If the rat hole should be dry, that is, have no production in it, the pressure in the rat hole will drop to atmospheric pressure as soon as the intake ports are opened. The well fluid pressure above the packer may be great. In deep wells this pressure will often exceed 5,000 pounds per square inch. Assuming this pressure to be 5,000 pounds per square inch, and assuming the packer to be 8" in diameter, and assuming the rat hole to produce no fluid, it is apparent that the pressure below the packer will be nothing; while the pressure above the packer will be 250,000 pounds plus. This great force, plus the considerable weight of the drill stem, plus the force of friction with which the packer will engage the seat, renders it very possible that the drill stem might be pulled in two before the packer will release, unless the pressure above and below the packer be equalized. This pressure is equalized the moment the drill stem is raised far enough to open the valve 30a, in the preferred form, or valve 51b in the first modified form, or far enough to uncover the openings 79b in the second modified form. In all three forms it will be noted that the pressure equalizes above and below the packer before any lifting force is exerted upon the drill stem; and therein resides one of the most important features of this invention.

The slots 7a, Figs. 3, 4, and 9, extending from opposite the lower end of the extension 30b, in the nipple 7, Fig. 3, to somewhat below the locking ring 32a below the packer 28, provide for circulation through the packer while it is being lowered into or being withdrawn from the well, and while the packer is being seated. These slots are closed against communication through the packer when the valve 30a engages its seat 29a, very slight clearance between the upper end 29c and extension 30b being allowed to relieve high pressure from below the packer while it is being completely seated. In addition to equalizing the pressure above and below the packer during the seating operation, as well as making it easier to lower and raise the packer in the well bore, the slots 7a also largely overcome the danger of the packer sticking or becoming fast in the rat hole, because these slots cause the pressure to equalize above and below the packer as soon as the valve 30a is raised from its seat, which occurs before any unseating pull is exerted upon the packer.

Well fluid is excluded from the drill stem before the packer is set by means of an inlet sleeve valve 33b slidably mounted within the nipple 7 and urged into closed position covering ports 7b in the nipple 7 by a spring 33 and a check valve 33c seated within the upper portion of said inlet valve by expansive force of spring 33a seated upon the retaining ring 33f which ring has threaded engagement within the lower end of valve 33b. The check valve has lugs 33d which extend outwardly and downwardly from the valve. These lugs engage upon the spring 33a and support the check valve properly removed from its spring in a manner which permits pump fluid to pass downwardly around the valve 33c and through the spring 33a when the drill stem is pumped through, as may be observed in Fig. 3.

It will be noted that inlet valve spring 33 is considerably stronger than the check valve spring 33a, thus providing that the pump pressure which will open the check valve will not, at the same time, unseat the inlet valve 33b. The expansive force of the spring 33a is aided by the pressure of well fluid exterior of the device in causing the check valve to remain closed. This check valve will not be opened by weight of the entrapped well fluid nor spill the test sample as the device is being withdrawn from the well, because the spring 33a is installed under enough compression to uphold a column of well fluid somewhat longer than the distance which the drilling mud will recede in the well bore while the drill stem is being withdrawn. If the drill stem should be pumped thru, the path of the pump fluid will be downwardly thru the inner string and the check valve assembly, past the instrument case 40, and out thru openings 10a in bottom end member 10. Manifestly, this bottom end member may be replaced by a bit of such size as will enter the rat hole, if, in lowering the tool, mud or cavings should require the use of a bit.

Inlet valve 33b, is normally urged upon its seat 7d by the spring 33, check valve 33c, normally closing the opening 33e. The inlet valve and check valve, acting independently of each other, serve the double purpose of excluding well fluid from the drill stem before the packer is set and of admitting test fluid into the drill stem after the packer has been set. This fluid enters the intake ports 27b via inlet ports 7b and annular chamber 7c, as appears in Fig. 4, after the inlet valve 33b has been forced downwardly past the inlet ports 7b by valve actuating nipple 27, after the latch has been sprung and the drill stem has been rotated clockwise part of a turn and has settled slightly, as will be explained. At conclusion of the intaking period, which is usually from 15 to 45 minutes, the inlet valve 33b is closed by spring 33 when the drill stem is raised, lifting the nipple 27. This occurs while the packer is still seated, and before any lifting force is exerted upon it.

Latch balls 36, Fig. 2, received within the circular recesses 1d—34a formed partly in the clamp member 1 and partly in the sleeve 34 positioned in a recess formed partly in the clamp member and partly in the nipple 2, are resiliently engaged between the ball rider ring 14 and ball floor ring 35 by the expansive force of latch spring 45. Latch spring base 3, secured within latch spring housing nipple 2 by means of welds 3a, supports spring 45, which spring, installed under compression, urges the latch to closed position and the entire device to its most elongated position. The recesses 1d—34a should preferably be formed to fit the contour of the latch balls and should be of a depth slightly less than one-half the diameter of the balls. If the recess 1d—34a is as deep or deeper than one-half the diameter of the balls, the balls will impinge between the ring 14 and the recess 34a, and thereby render the latch inoperative. The latch balls may be 1/16" to 1/8" in diameter. If the balls are 1/8" diameter, 5/64" to 3/32" depth of the groove 1d—34a will be found satisfactory. The ring 14, which may be pressed upon the lower end of member 11, preferably should be of hardened steel. Likewise the balls 36, ring 35, and sleeve 34 should be hardened. The sleeve 34 has a close removable fit within member 1, and is normally secured in position shown in Fig. 2 by the threaded engagement between member 1 and nipple 2. The latch spring 45 may be, for example, 9 feet long compressed to 7 feet installed, and should be of such strength as will enable the latch to be adjusted to support one-half to three-fourths the weight of the drill stem. The latch is held in the engaged position, as shown in Fig. 2, by the expansive force of spring 45, which urges the steeply inclined surface 35a against the balls which are thereby impinged upon the recesses 1d—34a.

When the latch is sprung, by weight of the drill stem, the balls ride downward between the rings 14 and 35, and in so doing, engage the inner surfaces of sleeve 34 and nipple 2. It will be noted that the upper surface of the ring 35 is of two angles. The steeper angle 35a engages the balls while they are imbedded in the recesses 1d—34a, as stated, thus imparting great force to the engagement. When the balls are forced out of the recess as the latch springs, they engage upon the more horizontal surface 35b, the angle of which is such as will return the balls into their recesses 1d—34a when the latch returns, but at the same time will not urge the balls outward with enough force to score the inner wall of nipple 2.

The depth to which the latch balls are allowed to become seated in the circular recess 1d—34a will govern the force required to release the latch and the latch may be adjusted to be sprung by the application of less force by lessening the depth to which they are allowed to enter within this recess. The less distance they enter it the more easily they can be forced out of it. Such adjustment may be made by screwing the nipple 2 upwardly within coupling member 4, locking ring 2a being employed to secure the adjustment. In making such adjustment, it can be observed that the ring 14 is not also forced upward as the nipple 2 is forced upward, because the clutch balls 38 engaging the lowermost pockets 17f of slots 17b do not permit such movement. It is apparent that another purpose of spring 45 is to automatically return the latch to engaging position after the force which springs it has been released.

The latch and clutch chamber c, Fig. 2, which is closed at its upper end by the connection member 11, slidable within the member 1, and is closed at its lower end by member 26, may be filled with a lubricant to provide lubrication for the latch and clutch. This lubricant may be supplied thru the openings shown closed by plugs 48 and 49, Fig. 2.

The clutch in Fig. 2 is shown in its normal engaged position, as when being lowered into or being withdrawn from the well. This clutch is formed of shell 17, balls 38, upper ball socket base 37, and lower ball socket base 39. The upper base 37, having slots 37a, Fig. 12, which are for circulation of a lubricant within the annular chamber c, may be pressed into clutch coupling member 4 and landed upon the internal, circular shoulder 4a, the flutes 37c being imbedded within the inner wall of this coupling member. The lower ball socket base 39, having circulation slots 39a, Fig. 13, similar to, and aligning with the circulation slots 37a, Fig. 12, is fitted closely but removably within the member 4 for convenience in assembling and taking the clutch apart. The lower base 39 is held in place by the threaded engagement between members 4 and 5, as appears in Fig. 2. The clutch balls 38 are received for one-half of their diameter within sockets 37b and 39b, Figs. 12 and 13, and extend for the other half of their diameter into the slots 17b, Fig. 14, formed by the several short ribs 17c and the one long rib 17j. These slots, like the sockets, have a common depth equal to approximately one-half the diameter of the balls 38. These slots are open at their upper ends and are of irregular shape in their closed lower ends where they are formed into pockets 17f, conforming to the balls. The upper portion of reduced external diameter 17a provides the annual space 17h, Fig. 2, also having a uniform width equal to one-half the diameter of the balls.

The shell 17, therefore, is movable longitudinally and rotatably within limits imposed by the slots 17b and the annular space 17h; longitudinal movement being permitted by the slots and the rotary movement being permitted by the turned off portion 17a.

The balls 38, Fig. 2, while being free to rotate in their respective sockets, cannot leave their sockets because, as stated, the slots 17b and annular space 17h have a common width equal to one-half the diameter of the balls. The lower base 39, otherwise free, is locked with upper base 37 by the balls imbedded equally within the mating sockets 37b and 39b, Figs. 12 and 13; and since the flutes 37c are securely imbedded within the couping member 4, it is apparent that the inner string and outer shell of the device are locked together against independent rotation as long as the balls remain within their respective slots 17b. The downward movement of the inner string at the beginning of the test, places the annular space 17h, Fig. 2, opposite the balls. This movement disengages the clutch. The drill stem may be then rotated freely upon rollers 25a, leaving stationary the outer shell and the packer, together with all other parts below the thrust bearing. The clutch is disengaged in this manner whenever the device is intaking test fluid, because the valve travel is determined by the travel of the member 26, having its upward movement arrested by the engagement of balls 38 within pockets 17f and its downward movement stopped by the landing floor 6b; this latter travel being sufficient to place the clutch balls 38 opposite the turned off portion 17a above the upper end of the longest rib 17j, which movement disengages the clutch.

At conclusion of the test there is no danger that the ribs may impinge upon the balls, due to some possible error in spacing the upper wedge shaped ends of the ribs, because the one rib 17j is longer than the others and, therefore, acts as a pilot to guide the other ribs between the balls. In the return movement of the shell 17 the sloping surfaces 17e, Figs. 2 and 14 automatically guide the clutch balls into their lower pockets 17f. The expansive force of the latch spring 45, aided by the weight of the movable shell of the device, plus the resistance offered to raising the packer from its seat in the rat hole, accomplishes this quick and automatic return of all parts to their normal positions at conclusion of each test.

The external flange 18a engaging under the internal flange 19a of the bearing shell member 19 holds the thrust bearing top 24, rollers 25a, and thrust bearing base 25 assembled by the threaded engagement between clutch shell member 19 and connection member 26. The packing 20, gland 21, and spring 23 adjustably held by clamp cap 22, threadedly engaged over the upper extension of member 19, provide that the thrust bearing will not permit leakage into or out of the drill stem.

The upper pockets 17d engage the clutch balls instantly after the latch springs. A slight clockwise rotation of the drill stem will then force the downwardly inclined surfaces 17g of shell 17 over the balls until the upper straight portion of slots 17b register in vertical alignment with the balls. The drill stem then moves downwardly by force of gravity until the member 26 lands upon the floor 6b, Fig. 2. This travel, as stated, is such as will place the turned off portion 17a of the shell above the longest rib 17f, at which time the drill stem may be rotated independently of the packer and other parts below the thrust bearing during the test intaking period. The method of landing the packer will be discussed in connection with operation.

The lower portion of connection member 16, immediately above the clutch shell, has slight clearance, such as 1/16" to 1/8" within the nipple 2, this clearance being for free passage of a lubricant, which preferably should be placed within the chamber c for lubrication of the latch and clutch. The lower piston-like end of member 11 and the other piston-like member 26 should preferably be of the same diameter, in order that the lubricant in chamber c will move freely between the pistons without impinging them on one stroke or causing a vacuum to be pulled between them on the other stroke, as would result if one piston were of greater diameter than the other.

It should be observed here that the clutch is always engaged while the latch is engaged, and vice versa. If mud or cavings be encountered while the device is being lowered into the well, the same may be washed out by pumping through the device or drilled out by rotating the drill stem. If the latch springs while the drill stem is being rotated the drill stem may be raised slightly to re-engage the latch. Rotation may be then resumed without danger of disengaging the clutch and opening the intake ports until the latch is sprung again. The latch, as stated, may be set to withstand as much weight as desired before it will be sprung. Ordinarily, rotating the drill stem while the device is being lowered will enable the packer to be seated in the rat hole without having to employ the pump. If, however, it should be necessary to rotate the drill stem and pump through it at the same time, both may be done. If it is pumped through, the drill stem, of course must be emptied by bailing, swabbing or by withdrawing it from the well before a clean test sample can be obtained.

The key 28c, fitted within registering slots in sleeve 29 and packer carrier nipple 7, Figs. 3, 4, and 9, is held in place within these slots by packer 28. It will be observed that the slot for this key in nipple 7 is intermediate the circulation slots 7a, and that it extends upward in nipple 7 far enough to permit the packer to assume the position shown in Fig. 4. If it is desired that the packer be installed so that it will rotate with the drill stem before the clutch is disengaged, this key will be employed. If, on the other hand, it is desired that the packer should not rotate with the drill stem while the clutch is engaged, this key will be left out.

The annular chamber 11c may be filled with a flare fluid of different color from the well fluid, red or yellow lead paint being generally satisfactory. The enlarged portion 11b of somewhat greater diameter than the lower end of the member 11, and having peripheral grooves 11a, has a close sliding piston fit within the flare chamber shell 1a, and the lower portion of member 11 has a close sliding piston fit within the central portion of member 1. Well fluid pressure entering through pressure ports 1c, causes packing 13 to engage closely upon the member 11. The flare fluid is placed in chamber 11c through ports 1b shown closed by rubber band 12. When the drill stem settles within the outer shell, as the intake ports are opened by a partial clockwise rotation and a slight settling of the drill stem, it is apparent that the flare fluid will be forced out of chamber 11c through discharge ports 1b, because the enlarged portion 11b is of a greater diameter than the lower end of member 11. The rubber band 12 yields to permit such escape of the flare fluid. When the drill stem is raised within the outer shell after the intaking period of the test, well fluid will enter the chamber 11c through ports 1b, the rubber band 12 yielding or rupturing to permit such entrance.

If it be desired to employ more flare fluid than that contained in chamber 11c, the chamber d may also be filled with flare fluid through the openings 6a, which may be then closed by a rubber band similar to the one employed to close the openings 1b.

The member 26, having peripheral grooves 26a, has a close piston fit within the nipple 5 and serves to confine the latch and clutch lubricant within the chamber c, as well as to determine the valve travel by landing upon floor 6b. The breather openings 6a provide that the member 26 will not impinge upon fluid in the chamber d on the downward stroke or pull a vacuum therein on the upward stroke, as is apparent.

The instrument case 40, Fig. 3, having lateral openings 40b, has a lower rod-like extension 40a which has its lower end of reduced diameter secured within a central opening through the bottom end of member 10 by means of a nut 44. Studs 41 are secured within the case by welds 41a. The cover 42 is secured by nuts 43. Instruments may be placed in the case 40 for the purpose of recording pressures and temperatures obtaining in the well. Well fluid in the rat hole below the packer enters the instrument case through openings 10a and 40b to contact the recording instruments.

In operation the device is shown in Fig. 1 as being lowered into the well bore a, on drill stem 46 with the packer approaching the rat hole b. The full weight of the drill stem, or as much thereof as may be necessary, is allowed to force the packer into engagement with a seat upon the rat hole, as appears in Fig. 4. This engagement must be such that well fluid from above the packer will not migrate downward past the packer while the device is intaking test fluid. In order to cause such engagement it is generally desirable that the packer be landed upon the rat hole several times. Each time the packer lands the latch will spring and the upper pockets 17d, Figs. 2 and 14, will engage the clutch balls 38, Fig. 2, while spring 28b will compress enough to allow valve 30a to close upon its seat 29a. This movement closes the slots 7a against allowing communication of well fluid above and below the packer. Each time the drill stem is raised the lower pockets 17f will engage the balls 38, and each time it is lowered the upper pockets 17d will re-engage the balls, this travel ordinarily being 1½" to 2", and not enough to cause the inlet ports 7b to be uncovered by the valve 33b. Each time the drill stem is raised the spring 28b expands, opening valve 30a and again equalizing the pressure above and below the packer through slots 7a.

When the operator is satisfied that the packer is properly seated, the drill stem is rotated clockwise, moving the downwardly inclined surfaces 17g, Figs. 2 and 14, upon the balls until the balls become vertically aligned with the upper portion of slots 17b. The drill stem then settles until the member 26 lands upon floor 6b. In this movement the valve actuating nipple 27 is forced downwardly, the lower end of reduced diameter 27a engaging inlet valve 33b, and forcing it downwardly also, until inlet ports 7b are uncovered (see Fig. 4). Well fluid from the rat hole then enters the drill stem via inlet ports 7b, the annular chamber 7c, and intake ports 27b. These ports are again closed by the reverse movement of the nipple 7 when the drill stem is raised at conclusion of the test, thereby entrapping within the drill stem the production from the rat hole during the period of the test. In order to repeat such tests in rapid succession without withdrawing the drill stem from the well, the packer may be raised from its seat and the test fluid may be bailed or swabbed out, after which the tool is ready to be re-set and the operation may be repeated as often as is desired.

Some of the flare fluid discharged as hereinbefore stated will pass by the packer and be found in the drill stem if the packer fails to form a perfect seal-off against downward movement of well fluid above it. If no flare fluid be found in the drill stem, the packer is known to have formed a complete seal-off upon the rat hole. In this manner a formation test is made to positively disclose where the test fluid came from.

When the device is withdrawn from the well, in addition to learning the amount and physical properties of the production, it is also desirable to know the temperature at different levels as well as the temperature variations which obtained in the tested formation during the test, and also the pressures and variations in pressures which obtained there during that time. If the operator checked his time with the timing mechanism of the recording instruments and kept a record of time when the device was at different levels going in and coming out of the well, as should always be done, the above information will be found in the instrument case, from which the instruments may be removed by unscrewing nipple 9 and removing the lid 42.

If the test should reveal unwanted production in the rat hole, cement slurry may be pumped through the device and into the formation to be plugged, in which event the cement will take the reverse path to that indicated for the test fluid, as plainly appears in Fig. 4.

The first modified form of the invention shown in its normal position of the parts in Fig. 11, and seated upon a rat hole intaking test fluid in Fig. 15, is the same as the preferred form shown in Figs. 2 and 3 above the line a—a and below the line b—b. This modified form, therefore, will be considered, for the purpose of completing Fig. 11, as inserted into Figs. 2 and 3 between the lines a—a and b—b.

The packer 54, similar to the packer in the preceding form, may be of rubber, leather, belting, or any other tough, durable substance, as stated for the preceding form. This packer is mounted upon a packer nipple 64, where it locked between upper retainer 53 and lower retainer 55, each having threaded engagement upon nipple 64. A stop ring 56, threadedly engaged over packer carrier nipple 57, holds the packer assembly resiliently mounted over nipple 57 by the expansive force of spring 52 within shell 51a, which shell engages upon the member 53 when the intake ports 58a are open, as appears in Fig. 15.

When the packer is being lowered into the well bore, or being withdrawn therefrom, and while the packer is being seated upon the rat hole, the equalizing ports 57a are open to provide that well fluid may circulate through the packer. The communication through the packer via ports 57a, the opening through nipple 57, and openings 10a, Fig. 3, continues until interrupted by the seating of valve 51b upon its seat 53a, at which time the spring 52 is compressed and housed wholly within shell 51a. This interruption of the pressure equalization above and below the packer occurs as the packer seats. Raising the drill stem slightly after valve 51b seats will always instantly re-establish equalization of pressure above and below the packer via ports 57a, nipple 57, and openings 10a.

The ball check valve 60 resiliently urged upon its seat in the lower end of nipple 58 by spring 65 engaging under check valve support 61, serves to exclude well fluid from the drill stem and to allow the drill stem to be pumped thru, as was explained for the check valve shown in the preceding form. The spring cage nipple 62, having threaded engagement upon the lower end of nipple 58, has slots 62a thru which the pump fluid discharges when support 61, having a close slidable fit within nipple 62 is forced downward by the pump pressure far enough to uncover these slots. The valve and its seat, being far enough apart when the pump fluid is discharged thru the slots, are thus prevented from being greatly damaged by abrasive substances in this fluid.

The nipple 58 has a close sliding fit within sleeve 59, having its external flange 59a locked between member 51 and nipple 57 by the threaded engagement between nipple 57 and member 51, which thus provides means for normally maintaining the intake ports 58a closed, as appears in Fig. 11.

When the packer lands, the latch springs, the drill stem is rotated clockwise part of a turn, and the clutch disengages, as was explained for the preceding form, member 26 lands upon member 51 and the intake valve opens by nipple 58 being forced downward far enough to uncover intake ports 58a, as appears in Fig. 15. In this position of the ports test fluid from the rat hole enters through openings 10a (see Fig. 3), passes around the instrument case, around the check valve assembly, and enters the drill stem through the intake ports 58a.

The key 63 fitted within registering slots in nipple 57 and 64 (see Fig. 32), may be employed to cause the packer to rotate with the drill stem, or may be left out of it, in order to provide that the packer will not be rotated with the drill stem, as was stated for the similar key shown in Fig. 3.

The chamber 50, Fig. 11, may be also employed as a flare means by filling it with flare fluid and closing the openings 51c with a rubber band in the same manner as was stated for the smaller chamber d in Fig. 2.

This modified form may be operated in the same manner and for all the purposes as was stated for the preferred form, to which reference is here made.

In the second modified form, Figs. 16, 17 and 20, a similar number of corresponding units, having different construction are employed in a similar manner as in both preceding forms to accomplish the same result.

The lower end of this device being the same as in Fig. 3 below the line b—b, it will be understood that the instrument case 40 and all other parts shown below the line b—b in Fig. 3 will be considered as added being below the line b—b in Fig. 17.

The outer shell of the second modified form, having limited telescopic movement over the inner string, consists of the latch assembling clamp member 66, latch adjusting nipple 69, clutch housing nipple 72, connection member 72a, having threaded engagement between members 69 and 72, and further secured upon nipple 72 by welds 72b; nipple 74, coupling member 98, nipple 76, connection member 77, having breather openings 77a; packer nipple 78, connection member 82, and nipple 83, the remaining portion of the outer shell and its contents being the same as shown below the line b—b, Fig. 3.

The inner string consists of drill stem connection member 84, upper clutch key nipple 85, having special wrench slots 85a'; bearing housing member 90, clutch base support 95, lower clutch key nipple 96, connection member 98, clutch shell 101, valve actuating nipple 102, and valve member 106, having a check valve assembly within it. The telescopic movement between the outer shell and the inner string is limited in one direction by the landing of connection member 98 upon upper steps 100a of the lugs 100, Fig. 26, and limited in the other direction by landing of the lugs 100 upon the irregular-shaped bottom ends of slots 101b, Fig. 27.

A packer member 80, such as was described for the preceding forms, is closely fitted over the nipple 78 where it is positioned between its upper retaining member 79, secured upon nipple 78 by welds 79a and 79c, and its lower retaining member 81, having threaded engagement over the nipple 78, and being adapted to engage the packer element closely against the member 79.

The pressure of well fluid equalizes above and below the packer by means of communication thru openings 79b, the central opening through nipple 78, and ports 78a, as appears in Fig. 17. This pressure equalizing communication continues while the device is being lowered into the well or being withdrawn therefrom and while the packer is being seated upon the rat hole. If, in securing a good seat for the packer, it should be necessary to make repeated landings of the packer upon the rat hole, this may be done without closing the equalizing passages, at any time, because when the latch springs, the lugs 100 arrest the downward movement of the inner string before the port cover 105 will, in its downward movement, close openings 79b, as will be more fully explained.

It being understood that the drill stem is empty when employed to lower the device into a well for a formation test, means are provided to exclude well fluid therefrom until the intake ports are opened in order to admit test fluid. This means is such that the drill stem may be pumped through at any time. The check valve 109 has an upper extension 109b slidable within member 106, and has discharge ports 109a slightly above valve seat 109c, below which seat the lower end sleeve 106d has a close sliding fit over the valve member 109, as appears in Figs. 17 and 20. This check valve has a central opening thru which rod 108 is closely, but slidably received. This rod depends from, and is supported by nut 107, having depending wings 107a, which land upon the upper end of member 106, in such manner as will allow free passage of fluid between nut 107 and nipple 102, as appears in Figs. 17 and 22.

Mounted over the lower end of rod 108 the coiled spring 112 is installed under compression between nuts 75 and gland 111, engaging upon packing 110; the evident purpose of which packing is to prevent leakage along the rod thru member 108. The spring 112 is under enough compression to hold the check valve normally seated and to prevent escape of test fluid as the drill stem is being withdrawn from the well, as was explained for the check valve in the preferred form. In case the drill stem should be pumped thru, which may be done at any time, the pressure of pump fluid unseating valve member 109, forces the discharge ports 109a below the sleeve 106d. The upper extension 109b, above ports 109a, is somewhat longer than the sleeve 106d, so that the valve members will remain in proper alignment when the valve opens. This construction also provides that the valve and also its seat 109c will not be greatly abraded by the pump fluid, because when this fluid is discharged, the valve seat is covered by extension 109b, and the valve is well below the sleeve 106d, as will be apparent from examination of Figs. 17 or 20. The annular space 106c, being the clearance between rod 108 and the member 106, is such as will allow free passage of the pump fluid and free entrance of the test fluid through it.

When the packer has been properly landed, a slight clockwise rotation of the drill stem frees the inner string, which descends and forces the valve member 106 downward until the annular recess 106a is opposite the inlet ports 78a, as appears in Fig. 20. The port cover sleeve 105, having its upper internally flanged end 105a normally engaged upon the upper end of member 106 by the force of spring 104, has a close sliding fit over the member 106, and has a close sliding fit within the nipple 78. This port cover sleeve maintains the recess 106a closed until, in descending, the lower end of this member 105 lands upon the internal circular shoulder 78b, and until the member 106 continues its downward travel far enough to assume the position shown in Fig. 20, in which position test fluid from the rat hole enters the drill stem via inlet ports 78a, recess 106a, intake ports 106b, and the annular open space 106c. The travel necessary to place the annular recess 106a opposite the intake ports 78a, as shown in Fig. 20, is determined by the distance between the lower end of connection member 98 and the upper steps 100a of the lugs 100, Fig. 26, upon which the member 98 lands to stop the downward movement of the inner string. Manifestly, the lower end of clutch shell 101 could be landed upon the connection member 77 to limit the valve travel, instead of landing the member 98 upon the lugs, as just stated, the choice of which means to employ in limiting the valve travel being a matter of choice to be determined on a basis of shop cost. The coiled spring 104, having a free fit over the nipple 102, is installed under enough compression to cause sleeve 105 to quickly and positively assume its normal position shown in Fig. 17, when the drill stem is raised at conclusion of the test intaking period. This spring has its upper end landed under ring 103 secured over nipple 102 by welds 103a.

The latch assembly consists of the same ball rider ring 14, latch balls 36, ball floor ring 35, having the two upper inclined surfaces 35a and 35b; circular recess 1d—34a, the upper half of this recess being within the member 66 and the lower half within the sleeve 68, and latch spring 45 as was described for the preferred form. This latch serves the same purpose as was stated for the preferred form, to which description reference is made. The latch in this modification may be adjusted to engage with less force by screwing the nipple 69 upward upon the member 72a, thereby forcing the latch balls to engage less deeply within the recess 1d—34a, as was also explained for the preferred form. The locking ring 71 may be employed to lock the nipple 69 so as to secure the latch in any adjusted position.

A floating clutch is shown in Fig. 16. This clutch consists of shell upper end member 86, Fig. 23, having internal longitudinal ribs 86a and 86b with tapered lower ends 86d, and forming slots 86c; shell 94 threaded upon the member 86 and welded thereto at 86e; lower end member 97, having internal longitudinal ribs 97a and 97b with tapered lower ends 97d, and forming slots 97c; upper clutch key nipple 85, having keys 85b with wedge shaped upper ends 85c; lower clutch key nipple 96, having keys 96a with wedge shaped upper ends 96b, and the thrust bearing consisting of members 91, 92, and 93.

The clutch shell is housed within the nipple 72, and contained therein against longitudinal movement between the lower end of connection member 72a and upper end of nipple 74. This shell has slight end clearance between member 72a and nipple 74, and also slight lateral clearance within the nipple 72. The upper clutch keys 85b, which are of equal length, have an easy sliding fit within the slots 86c, Fig. 23, and the lower clutch keys 96a, each of equal length, have an easy sliding fit within the slots 97c. Both upper and lower keys and slots are normally engaged, as shown in Fig. 16, which engagement causes the entire drill stem above and below the thrust bearing to be locked together as a unit. In operation, the upper and lower sets of male keys are thrust downward when the inner string moves downward after the latch has been sprung, and the drill stem has been rotated part of a clockwise turn, as was explained. This downward movement which causes the intake ports to be opened, places the keys entirely below the slots. The clutch is then disengaged and the drill stem above the thrust bearing may be rotated independent of all other parts. The packer and the entire outer shell of the device from its lower extremity up to and including its upper member 66, remains stationary while the clutch is disengaged and the drill stem is rotated.

The clutch being disengaged, if the drill stem be then raised, the clutch and latch will become re-engaged by the expansive force of spring 45, aided by the weight of the outer shell of the device, plus the force required to pull the packer out of its seat in the rat hole. The tapered lower ends 86d, Fig. 23, of the upper ribs and the tapered lower ends 97d, of the lower ribs, will guide the upper and lower keys back into their engaged position within slots 86c and 97c respectively. Two of these ribs, one being rib 86b, of the upper member 86, and the other rib 97b, of the lower member 97, extend downward below their companion ribs, thus serving as guides to pilot the male keys back into their respective slots, similar to the manner by which the ribs and balls of the clutch, in Fig. 2, were shown to become aligned in the re-engaging movement of the clutch when the drill stem is raised after the intake ports have been uncovered.

The externally flanged end 85a, Fig. 16, engaged under the internal flange 90b, rests upon the thrust bearing assembly composed of top 91, base 92, and rollers 93. This bearing is made leak proof by packing 89 engaged by gland 88 urged upon the packing by spring 88b held in place by the cap 87. It will be observed that the longitudinal slots 90a, Fig. 16, in the internal flange 90b and the similar slots 87a, Fig. 31, in the cap 87, are adapted to admit and pass over the male clutch keys 85b for convenience in assembling the parts 87 and 90 over the upper clutch key nipple 85 and its keys 85b. The gland 88 is shown as cut in two at 88a, Fig. 16, also to enable assembling.

Means for landing the packer is shown proximate the lower end of Fig. 16. The lugs, Fig. 26, removably fitted within the slots 99c, Fig. 25, and secured therein against rotation within member 99 by internal ribs 99a, having thru them slots 99b for circulation of a lubricant, have their shell 100e locked between the nipples 74 and 76. Each of these lugs is freely received within the lower irregular shaped portions of slots 101b formed by and between ribs 101a. These irregular portions conform to the shape of the lugs, except that the lugs have space for limited upward movement in the lower end of these slots, as appears in Fig. 27, where one of the lugs, partially broken away, is shown placed in one of the slots.

The distance between the upper steps 100a, Figs. 26 and 27, and their opposing steps 101c, in the shell 101, Fig. 27, is equal to the distance between lower steps 100b and their opposing steps 101d. This distance between the steps of the lugs and the steps in the shell is such that when these steps engage the shell 101 may be slightly rotated clockwise in order to bring the lugs into the lower ends of the straight portions of the slots 101b, at which time the weight of the drill stem will force the shell 101 downward far enough to open the intake ports, as is shown in Fig. 20.

The packer may be landed upon the rat hole as often as is necessary to obtain a good seat, as stated. Each time the packer lands the latch will spring, and the lugs 100 will engage the opposing steps 101c and 101d of the clutch shell. Each time the drill stem is raised slightly the latch will re-engage and the lugs will move to engage the lower irregularly shaped ends of the slots as appears in Fig. 27. The packer being properly landed the drill stem is rotated clockwise part of a turn causing the lugs to register with the straight portions of the slots; whereupon the drill stem settles opening the intake ports as stated, and thus begins the intaking period of the test.

The distance between the lugs and their upper steps or seats 101c and 101d when the lugs are in the position shown in Fig. 16, should be less than the travel necessary to disengage the clutch for the obvious reason that if the clutch should disengage before the lugs engage on their upper landings would turn upon the bearing and, therefore, could not be employed to place the lugs 100 and slots 101b in vertical alignment for the purpose of initiating the valve movement necessary to allow intaking of test fluid through the ports 106b.

It will be noted that each of the upper steps 100a and the lower steps 100b is formed with a sloping upper surface indicated by the angle 100c, Fig. 26, this angle being the same for both steps. The steps 101c and 101d in the shell 101, each have their upper surfaces formed with a mating slope conforming to the angle 100c. This angle inclines so that the drill stem will be forced upward slightly as it is being rotated clockwise part of a turn. These mating engaging surfaces provide that the lugs and their upper landing places will always engage when the latch springs, and that they will not be disengaged unless the drill stem be rotated as stated.

The distance between the steps 100a and 100b of the lugs and the distance between their mating steps 101c and 101d, Fig. 27, are not only the same, but these steps are each of equal width. When the drill stem is rotated part of a turn clockwise in order to bring the lugs and the upper straight portion of the slots 101b into perpendicular alignment, it is apparent that two slight drops of the drill stem will take place, the first drop occuring when the lower steps 100b move to engage the upper steps 101c while the upper steps 100a move into the slots 101b. This drop will be one to two inches, such being the usual length of the steps.

The second downward movement of the drill stem will occur when the drill stem has been rotated clockwise slightly further, at which time the lower steps 100b will disengage from the upper steps 101c and all of the lugs 100 will completely enter the slots 101b. This second downward movement of the drill stem causes the clutch to disengage and the intake valve to open as has been previously explained.

When the drill stem is raised at conclusion of the intaking period, the inclined surfaces 101e, Fig. 27, all being at the same angle, will guide the lugs, then having their sloping surfaces 100d landed upon the sloping surfaces 100e, back into the position shown in Fig. 16.

The latch clamp member 66, Fig. 16, has a close sliding fit over the connection member 84. Packing 67 is compressed against member 84 by well fluid acting thru openings 66a. The annular chamber e, extending between the members 84 and 101, Fig. 16, may be filled with a lubricant of such color as will identify it from the well fluid, as was explained for the preferred form. This lubricant, in addition to easing the action of the latch, clutch, and other parts in the chamber e, serves as a flare which will be forced out through the openings 69a and past rubber band 70 when the intake valve opens. Such displacement occurs because the member 84 is of somewhat greater diameter than that of the piston-like lower end of member 101. The slots 97e, Fig. 16, similar to the slots 86f in the upper end member 86, provide that the lubricant may circulate between the nipple 72 and shell 94. The chamber e may be filled or drained through the openings shown closed by band 70 and plug 73. Manifestly, well fluid will be drawn into the chamber e when the member 84 returns to the position shown in Fig. 16, at conclusion of the intaking period. This chamber should be drained and refilled with flare fluid each time the device is withdrawn from the well.

It is apparent that the chamber db, Figs. 16 and 17, may be filled with a flare fluid, and the openings 77a may be closed with an elastic band, such as the one shown at 70, Fig. 16, thereby replacing or supplementing the use of chamber e for the purpose of discharging flare fluid above the packer.

The instrument case and other parts below the line b—b, Fig. 17, being the same as shown below the line b—b, Fig. 3, reference is made to the specification for the preferred form.

The purposes and operations of the second modified form are like those described for the two preceding forms.

It is understood that all references to positions and directions, such as "upper" and "lower," "upward" and "downward," "above" and "below," apply to the tool as illustrated in the accompanying drawings wherein the upper portion of the tool is shown uppermost.

It is understood that the details of construction and arrangement of parts are subject to many obvious variations and minor changes without departing from the scope and purpose of my invention as defined by the appended claims.

What is claimed is:

1. A tool of the character described including an operating string of pipe, a shell releasably connected to said pipe, a swivel connection in said pipe, a packer portion carried by said shell below said swivel connection, spring means normally holding said packer portion extended on said shell, and means to by-pass fluid through said packer when said spring is collapsed.

2. A tool of the character described including an operating string of pipe, a shell releasably connected to said pipe, a swivel connection in said pipe, a packer portion carried by said shell below said swivel connection, and means to by-pass fluid through siad packer portion, and additional means on said pipe and shell to move said shell relative to said packer portion to close said second means.

3. A tool of the character described including an operating string of pipe, a shell releasably connected to said pipe, a swivel connection in said pipe, a packer portion carried by said shell below said swivel connection, spring means between said packer portion and part of said shell, means to by-pass fluid through said packer portion, and means also movable by said pipe to open said shell for the admission of well fluid from below said packer upon collapsing of said spring.

4. A tool of the character described including an operating string of pipe, a shell releasably connected to said pipe, a swivel connection in said pipe, a packer portion carried by said shell below said swivel connection, means to by-pass fluid through said packer portion, and means also movable by said pipe to open said shell for the admission of well fluid from below said packer, said last means including a combination sleeve and check valve to uncover ports in said shell and permit downward circulation of fluid through said pipe.

5. A formation testing tool including a shell, a packer slidable thereon, a by-pass through said packer, an operating pipe to move said shell when said packer is seated to open and close said by-pass, and a latch disposed between said pipe and shell to indicate relative movement of said pipe and shell.

6. A formation testing tool including a shell, a packer slidable thereon, a by-pass through said packer, an operating pipe to move said shell when said packer is seated to open and close said by-pass, and ports in said pipe to be aligned with ports on said shell upon relative sliding movement of said shell and pipe.

7. A formation testing tool including a shell, a packer slidable thereon, a by-pass through said packer, an operating pipe to move said shell when said packer is seated to open and close said by-pass, ports in said pipe to be aligned with ports on said shell upon relative sliding movement of said shell and pipe, and a check valve carried by said pipe.

8. A drill stem, a shell thereon, a latch and clutch between the shell and stem, and inlet ports to admit fluid inside of said stem, all having cooperative parts on said stem and shell, and a packer on said shell to seat in the well bore whereby subsequent relative movement of said stem will actuate said latch and clutch and open said ports.

9. An operating string of drill stem or pipe, a shell adapted to have limited telescopic movement over the lower portion of said pipe, a packer and packer assembly adapted to have limited telescopic movement over said shell, a spring normally holding said packer extended on said shell, intake ports in said shell, a piston in said shell, said piston being adapted to open and close said intake ports; intake ports in said pipe, said ports being adapted to admit well fluid into the drill stem after the packer is set, by-pass openings between the packer and the shell, a valve on said packer assembly adapted to close said by-pass openings when the packer is set, a latch engageable between said pipe and shell, a clutch operable between said pipe and shell, a thrust bearing swivel connection in said pipe, a chamber for flare fluid in said shell above the packer, said flare fluid to be expelled therefrom when the packer is set, a flare fluid in said chamber, a check valve in said shell, and an instrument case in said shell below the packer.

10. An operating string of drill stem or pipe, a shell adapted to have limited telescopic movement over the lower portion of said pipe, a packer assembly adapted to have limited telescopic movement over said shell, a spring normally holding said packer extended on said shell, intake ports in said shell, a piston in said shell, said piston being adapted to open and close said intake ports, intake ports in said pipe, said ports being adapted to admit well fluid into the drill stem after the packer is set, by-pass openings between the packer and the shell, a valve on said packer assembly adapted to close said by-pass openings when the packer is set, and a check valve in said shell.

11. An operating string of drill stem or pipe, a shell adapted to have limited telescopic movement over the lower portion of said pipe, a packer assembly adapted to have limited telescopic movement over said shell, a spring normally holding said packer extended on said shell, intake ports in said shell, a piston in said shell, said piston being adapted to open and close said intake ports, intake ports in said pipe, said ports being adapted to admit well fluid into the drill stem after the packer is set, pressure equalizing ports in said shell, a valve on said packer assembly adapted to close said equalizing ports when the packer is set, a latch engageable between pipe and shell, a clutch operable between said pipe and shell, a thrust bearing swivel connection in said pipe, a flare fluid chamber in said shell, a flare fluid in said chamber, a piston in said chamber, said piston being adapted to discharge the contents of the chamber above the packer when the same is set, a check valve in said shell, and an instrument case in said shell below the packer.

12. An operating string of drill stem or pipe, a shell adapted to have limited telescopic movement over the lower portion of said pipe, a packer assembly adapted to have limited telescopic movement over said shell, a spring normally holding said packer extended on said shell, intake ports in said shell, a piston in said shell, said piston being adapted to open and close said intake ports, intake ports in said pipe, said ports being adapted to admit well fluid into the drill stem after the packer is set, pressure equalizing ports in said shell, a valve on said packer assembly adapted to close said equalizing ports when the packer is set, and a check valve in said shell.

13. An operating string of drill stem or pipe, a shell adapted to have limited telescopic movement over the lower portion of said pipe, a packer secured upon said shell, intake ports in said shell, a sleeve slidable in said shell, a piston in said sleeve, said piston having an axial opening, and having intake ports communicating with said axial opening, said intake ports being normally out of communication with the intake ports in said shell and being adapted to move into communication with said latter ports when the packer is set, a latch engageable between said pipe and shell, a floating clutch in said shell, said clutch being operable to releasably engage said pipe and shell, a thrust bearing connection in said pipe, a flare fluid chamber in said shell, a flare fluid in said chamber, a piston in said chamber, said piston being adapted to discharge said flare fluid above the packer when the same is set, a second flare fluid chamber also in said shell, a check valve in said piston, said check valve being adapted to allow fluid to be pumped through the drill stem, and an instrument case in said shell below the packer.

14. An operating string of drill stem or pipe, a shell adapted to have limited telescopic movement over the lower portion of said pipe, a packer secured upon said shell, intake ports in said shell, a sleeve slidable in said shell, a piston in said sleeve, said piston having an axial opening and having intake ports communicating with said axial opening, said intake ports being normally out of communication with the intake ports in said shell and being adapted to move into communication with said latter ports when the packer is set, and a check valve in said piston, said check valve being adapted to allow fluid to be pumped through the drill stem.

ALEXANDER BOYNTON.